(12) United States Patent
Bakula et al.

(10) Patent No.: US 6,220,448 B1
(45) Date of Patent: *Apr. 24, 2001

(54) SCREEN ASSEMBLY FOR VIBRATORY SCREENING MACHINE

(75) Inventors: John J. Bakula, Grand Island; Keith F. Wojciechowski, Lakeview, both of NY (US)

(73) Assignee: Derrick Manufacturing Corporation, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/907,549

(22) Filed: Aug. 8, 1997

Related U.S. Application Data (63) Continuation-in-part of application No. 08/412,685, filed on Mar. 29, 1995, now Pat. No. 5,673,797.

(51) Int. Cl.[7] .................................................. B07B 1/49
(52) U.S. Cl. ................................. 209/392; 209/403
(58) Field of Search .................................. 209/392, 400, 209/403, 309, 325, 326

(56) References Cited

U.S. PATENT DOCUMENTS

| | | |
|---|---|---|
| 607,598 | 7/1898 | Closz . |
| 966,578 | 8/1910 | Murphy et al. . |
| 1,561,632 | 11/1925 | Woodward . |
| 1,999,769 | 4/1935 | Lincoln ............................. 209/403 |
| 2,314,879 | 3/1943 | Heller ............................... 209/403 |
| 2,315,055 | 3/1943 | Heller ............................... 209/400 |
| 3,101,314 | 8/1963 | Johnson ......................... 209/403 X |
| 3,968,033 | 7/1976 | Illemann et al. .................... 209/403 |
| 4,033,865 | 7/1977 | Derrick, Jr. ........................ 209/275 |
| 4,374,169 | * 2/1983 | Gryrkiewicz et al. ........... 209/392 X |
| 4,575,421 | 3/1986 | Derrick et al. ...................... 209/397 |
| 4,819,809 | 4/1989 | Derrick .......................... 209/392 X |
| 4,820,407 | 4/1989 | Lilie ................................... 209/397 |
| 4,857,176 | 8/1989 | Derrick et al. ...................... 209/392 |
| 5,131,177 | * 7/1992 | Sy, Jr. .................................. 40/593 |
| 5,221,008 | 6/1993 | Derrick, Jr. et al. ................ 209/392 |
| 5,330,057 | 7/1994 | Schiller et al. ...................... 209/392 |
| 5,332,101 | 7/1994 | Bakula ............................... 209/403 |
| 5,417,793 | 5/1995 | Bakula ............................ 156/308.2 |
| 5,551,575 | * 9/1996 | Leone .............................. 209/403 X |
| 5,673,797 | 10/1997 | Bakula et al. ....................... 209/392 |
| 5,738,746 | 4/1998 | Billingsley et al. ................ 156/239 |

OTHER PUBLICATIONS

See Attached Sheets and Exhibits A, B, C, D, E and F.

* cited by examiner

Primary Examiner—Tuan N. Nguyen
(74) Attorney, Agent, or Firm—Joseph P. Gastel (57) ABSTRACT

A screen assembly for a vibratory screening machine including a plurality of superimposed screens, channels on the edges of the screen assembly, and a plurality of hollow plastic channeling strips fused into the plurality of superimposed screens. The hollow channeling strips may have metal rods therein, and the plurality of superimposed screens may be bonded to an apertured plate. A method of fabricating a screen assembly for a vibratory screening machine including the steps of laying a plurality of plastic tubes into grooves of a fixture, superimposing the plurality of screens over the plastic tubes, and applying a heated platen to the screens to thereby cause the plastic tubes to fuse into the screens. The hollow plastic tubes may have metal rods therein, and the plurality of screens may be bonded to an apertured plate before the hollow plastic tubes are bonded to the screens.

24 Claims, 6 Drawing Sheets

SCREEN ASSEMBLY FOR VIBRATORY SCREENING MACHINE

CROSS-REFERENCE TO RELATED APPLICATIONS

This application is a continuation-in-part of application Ser. No. 08/412,685, filed Mar. 29, 1995, now U.S. Pat. No. 5,673,797.

BACKGROUND OF THE INVENTION

The present invention relates to an improved screen assembly having channeling strips thereon for channeling the flow of material during a vibratory screening operation and to a method of fabrication thereof.

By way of background, screening assemblies for use in vibratory screening machines are well known in the art. One type in common use is fully disclosed and described in U.S. Pat. No. 4,575,421. It is also known that screen assemblies having longitudinal strips of various types thereon have been used in the past to channel flow of materials in columns and to thus prevent the materials from migrating away from the center of the screen during vibration. It is with an improved screen of the foregoing type that the present invention is concerned.

BRIEF SUMMARY OF THE INVENTION

It is one object of the present invention to provide an improved screen assembly for a vibratory screening machine which has unique channeling strips bonded thereto in an unique manner.

It is another object of the present invention to provide an improved method for fabricating a screen assembly having channeling strips bonded thereto. Other objects and attendant advantages of the present invention will readily be perceived hereafter.

The present invention relates to a screen assembly for a vibratory screening machine comprising a screening screen having an upper surface, longitudinal side edges on said screening screen, a plurality of spaced elongated plastic strips extending longitudinally between said longitudinal edges and fused to said screen and extending above said upper surface, and stiffening rods in said elongated channelling strips.

The present invention also relates to a method of fabricating a screen assembly for a vibratory screening machine comprising the steps of providing a fixture having a plurality of grooves therein, laying a plurality of elongated plastic members having stiffening rods therein into said grooves, superimposing a screening screen over said tubes, and applying a heated platen to said screen to thereby cause said plastic strips to fuse into said screen.

The various aspects of the present invention will be more fully understood when the following portions of the specification are read in conjunction with the accompanying drawings wherein:

DETAILED DESCRIPTION OF THE INVENTION

Figure 1:
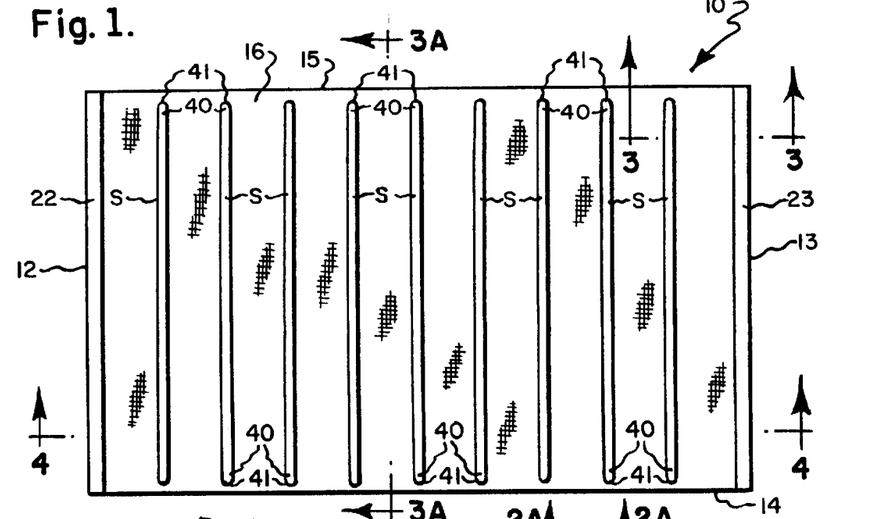
FIG. 1 is a plan view of the improved screen assembly of the present invention.

The screen assembly 10 of the present invention is a modification of the screen shown in U.S. Pat. No. 4,575,421, and it has a plurality of plastic channeling strips S fused to the surface thereof for the purpose of channeling the material being screened in rows substantially longitudinally across the screen.

The improved screen assembly 10 of the present invention includes a perforated metal plate 11, such as steel or any other suitable metal, having a first pair of opposite side edges 12 and 13 and a second pair of opposite end edges 14 and 15 and an upper surface 16 and a lower surface 17. Plate 11 includes openings 19 which are bordered by elongated metal strip-like portions 20 which extend from side edge 12 to side edge 13 and by staggered shorter strip-like portions 21 which extend lengthwise between end edges 14 and 15. The openings 19 are formed by a punching operation and are quadrangles of approximately one inch square with rounded corners, but they may be of any other desired shape or size. The dimensions of openings 19 should not be less than about one-half inch or greater than about four inches, and more preferably not greater than about two and one-half inches and most preferably not greater than about one inch. Strip-like portions 20 and 21 are approximately 1/10 inches wide, but they may be of any desired width. The length of plate 11 between side edges 12 and 13 may be approximately four feet and its width between edges 14 and 15 may be approximately 3 1/3 feet and it may have a thickness of about 1/16 of an inch. However, it will be appreciated that the size of plate 11 may vary as required to fit different machines. In a plate 11 which is about four feet in length, there will be about 35 openings 19 in each row between edges 12 and 13 when the openings are one inch square. Thus, the width of each opening is a small fraction of the length of the plate between edges 12 and 13. The same is true of the relationship between the height of openings 19 and the width of the plate between edges 14 and 15. Channel-shaped members 22 and 23 include portions formed integrally with plate 11 at side edges 12 and 13, respectively, and sheet metal binders 28 are formed on the channel members.

Figure 2:
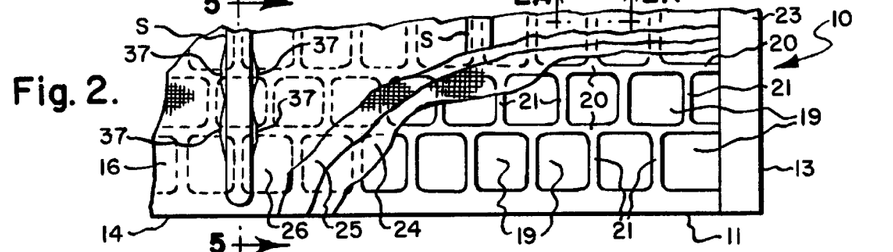
FIG. 2 is an enlarged fragmentary plan view of the screen of FIG. 1.
Figures 2A, 3, 3A:
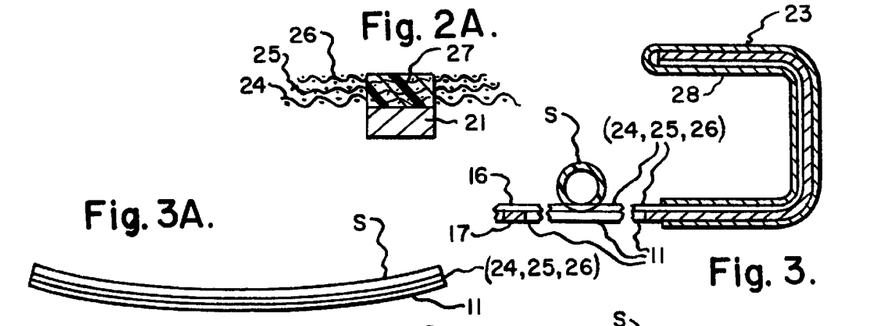
FIG. 2A is a fragmentary cross sectional view taken substantially along line 2A—2A of FIG. 2.
FIG. 3 is a fragmentary enlarged cross sectional view taken substantially along line 3—3 of FIG. 1.
FIG. 3A is a schematic view taken substantially in the direction of arrows 3A—3A of FIG. 1 and showing the tendency of the screen assembly to bow when a mass of plastic is fused thereto.

A coarse support screen 24 extends substantially entirely across upper surface 16. Screen 24 may be of between about 8 and 75 mesh, or any other suitable mesh. A first fine screening screen 25 extends over the entire coarse screen 24 and is in contiguous abutting relationship therewith. A second fine screening screen 26 extends across the entire upper surface of fine screen 25 and is in contiguous abutting relationship therewith. Coarse screen 24 is basically a support for the portions of screens 25 and 26 which overlie openings 19. Screens 24, 25 and 26 are secured to the elongated border portions 20 and 21 and to each other and by epoxy adhesive 27. However, other suitable equivalent adhesives or methods of bonding may be used. Thus, the borders of the portions of screens 24, 25 and 26 overlying each opening 19 are firmly adhesively bonded to the border portions formed by elongated strip-like portions 20 and 21. Screens 25 And 26 may be between 80 and 400 mesh, and preferably central screen 25 has openings which are approximately 20% larger than the openings of top screen 26 so that any particle passing through screen 26 will pass through screen 25. The border portions 20 and 21 can be seen through the screens when the screen assembly is viewed in plan. However, border portions 20 and 21 have been omitted from FIG. 1 for ease of illustration.

Figure 4:
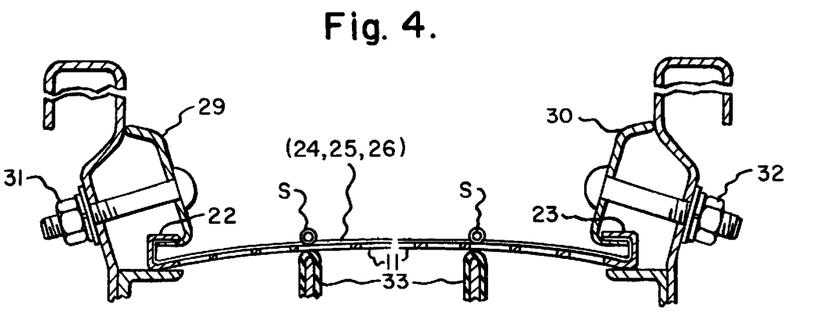
FIG. 4 is a fragmentary cross sectional view taken substantially along line 4—4 of FIG. 1 and showing the screen assembly of the present invention mounted on a vibratory screening machine.

Screen assembly 10 is mounted in a vibrating screening machine by means of elongated channel-shaped draw bars 29 and 30 which engage channels 22 and 23 as shown in FIG. 4 and are drawn up by means of nut and bolt assemblies 31 and 32, respectively, or other suitable tensioning means, as is well known in the art. Screen assembly 10 rests on a frame (not shown) having a plurality of elongated stringer members 33 extending longitudinally parallel to side edges 12 and 13 and supported at their opposite ends on the frame. In its operative position screen assembly 10 is bowed slightly so that its center along a line parallel to side edges 12 and 13 is higher than the outer edges 12 and 13, as is well known. Screen assembly 10 may also be inclined downwardly or upwardly between upper edge 15 and lower edge 14 or it may be horizontal, as is well known. Material to be screened is fed onto screen assembly 10 at edge 15 and passes toward edge 14 as screen assembly 10 is vibrated in the conventional manner. As noted above, border portions 21 are staggered. The reason for this is that since the material to be screened is fed onto screen assembly 10 at end edge 15 and moves toward end edge 14, the staggering will prevent the material being screened from following the border portions 21 without passing over openings 19.

The foregoing description of a portion of screen assembly 10 is set forth in the above-mentioned prior U.S. Pat. No. 4,575,421.

Figure 4A:
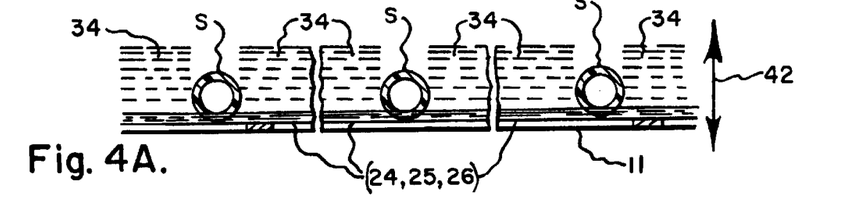
FIG. 4A is a fragmentary schematic view showing the action of the screen assembly during vibration and the relationship of the material being screened thereto.

In accordance with the present invention, a plurality of plastic channeling strips S are fused to the upper surface of the above-described screen and plate portion of screen assembly 10 for guiding material 34 (FIG. 4A) in rows as it passes from edge 15 toward edge 14. Channeling strips S extend longitudinally of side edges 12 and 13. At this point it is to be noted that plastic tubes S are oriented on screen assembly 10 so that when the screen assembly is mounted in a vibratory screening machine, each tube S will overlie an elongated stringer member 33 so that there will be no additional blocking of the screen openings in addition to the blocking produced by stringers 33. At this point it is to be noted that a conventional vibratory screening machine has nine stringers 33 and that the screen assembly 10 has nine channeling strips S, each of which overlies a stringer 33. It will be appreciated that there can be more or less than nine strips S depending on the structural requirements of the vibrating framework, that is, the number of stringers such as 33.

Figure 5:
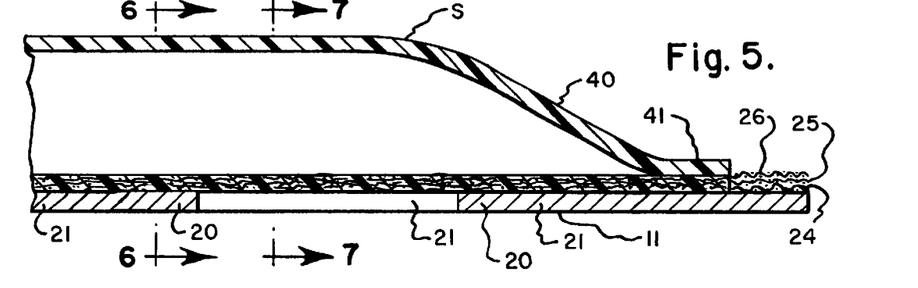
FIG. 5 is a greatly enlarged cross sectional view taken substantially along line 5—5 of FIG. 2 and showing the contour of the ends of the channeling strips.
Figure 6:
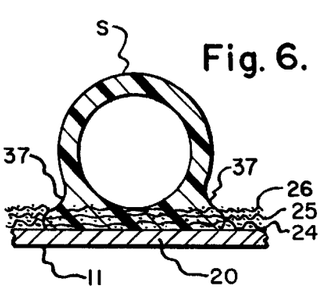
FIG. 6 is a fragmentary cross sectional view taken substantially along line 6—6 of FIG. 5 and showing the channeling strip fused into the screen assembly.
Figure 7:
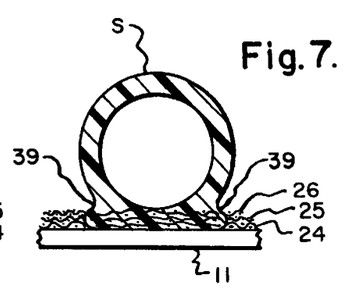
FIG. 7 is a fragmentary cross sectional view taken substantially along line 7—7 of FIG. 5.

The plastic strips S, which are fused to the upper surface 16 of the screen assembly in the present instance are cylindrical polyethylene tubes which have their portions which are contiguous to the metal strips 21 fused into fillet-like shapes as at 37 (FIG. 6). The portions which cross only the screens are fused into them, as shown in FIG. 7 and there are small fillets 39 at the edges of the tubes S. The fillets 37 and 39 tend to prevent foreign material from packing the junctions between the tubes S and the adjacent portions of the screen assembly. The end portions 40 of strips S are tapered downwardly (FIG. 5) and merge into the upper screen 26 at 41 to thereby close the ends of the tubes S. However, if desired the open ends of the tubes may be plugged with a suitable material rather than tapering them to a closed condition.

Because of the fact that the tubes S fuse into the screen, they are firmly bonded thereto so that they can withstand the high G forces to which they are subjected in operation. As an incident to their vibration as depicted by arrow 42 in FIG. 4A, the material which is being screened will form columns even though the height of the material is higher than strips S.

Figure 8:
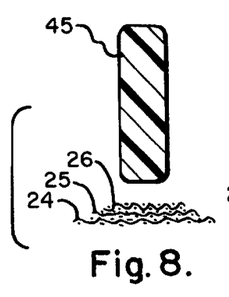
FIG. 8 is a cross sectional view showing another possible shape of channeling strip.

At this point it is to be noted that a balance must be reached between the mass and height of each strip S to avoid the tendency for curving the plate and the screen. In this respect, if a solid plastic strip of sufficient mass is used, its inherent shrinkage after cooling will bow the plate 11 as depicted in schematic FIG. 3A. A slight amount of bowing is acceptable. However, an excessive amount of bowing is unacceptable. The slight amount of bowing can be straightened out when the screen assembly 10 is mounted as shown in FIG. 4. It has been found that the use of the hollow polyethylene tubes S will give sufficient height but they will have insufficient mass to bow the remainder of the screen assembly 10 excessively. Furthermore, the tubes S have to be sufficiently thick so that they will not melt down when subjected to the heat required to fuse them into the remainder of the screen assembly. In the present instance polyethylene tubes were used having a $\frac{3}{8}$" outer diameter and a $\frac{1}{4}$" inner diameter with a wall thickness of $\frac{1}{16}$". While round polyethylene tubes have been depicted and have been used, it will be appreciated that other shapes can also be used satisfactorily, and such shapes may include the hollow triangular shape 43 of FIG. 9 and the hollow rectangular shape 44 of FIG. 10. In addition, there is no reason why a solid rectangular member, such as 45 of FIG. 8, cannot be used provided that it does not have sufficient strength resulting from its shrinkage so as to bow the screen excessively when it cools after having been heated. In this respect, it is contemplated that polyethylene rectangular bars $\frac{1}{8}$" wide×$\frac{1}{2}$" high can be used with the remainder of the screen assembly having the above-described parameters. However, a hollow geometric shape is preferred inasmuch as it will not have the lateral distortion which may occur in a solid shape, such as shown in FIG. 8.

It is to be especially noted that the polyethylene plastic, as described above, has yieldability and resilience so that it can be stretched to a straight condition, even though it is slightly bowed. It will be appreciated that other suitable thermoplastic plastics may be used including but not limited to such plastics as polypropylene and polyurethane.

The method of fabricating the screen assembly 10, which was described with respect to FIGS. 1–7, is depicted in FIGS. 11–16. In this respect, the subassembly of the plate and its screens 24, 25 and 26 is initially fabricated by bonding the three screens to the plate 11 by epoxy. This technique is well known in the art and it merely comprises coating the plate 11 with epoxy and thereafter pressing the three screens to it until the epoxy hardens and thereafter bending the edges of the plate 11 into channels 23.

In order to bond the tubes or channeling strips S to the remainder of the screen assembly 10, a fixture 47 is provided having nine grooves 49 therein. Each groove 49 receives a straight tube S which has an outer diameter of $\frac{3}{8}$ inch and an inner diameter of $\frac{1}{4}$ inch. The grooves are approximately $\frac{9}{32}$" deep, leaving $\frac{3}{32}$" of each tube protruding above top 50. The ends of grooves 49 taper upwardly, as shown at 51 (FIG. 13), so that when the tubes S are therein, the end portions will lie $\frac{1}{8}$" higher than the central portions of the tubes.

Figures 12, 13, 14, 15, 16, 17, 18:
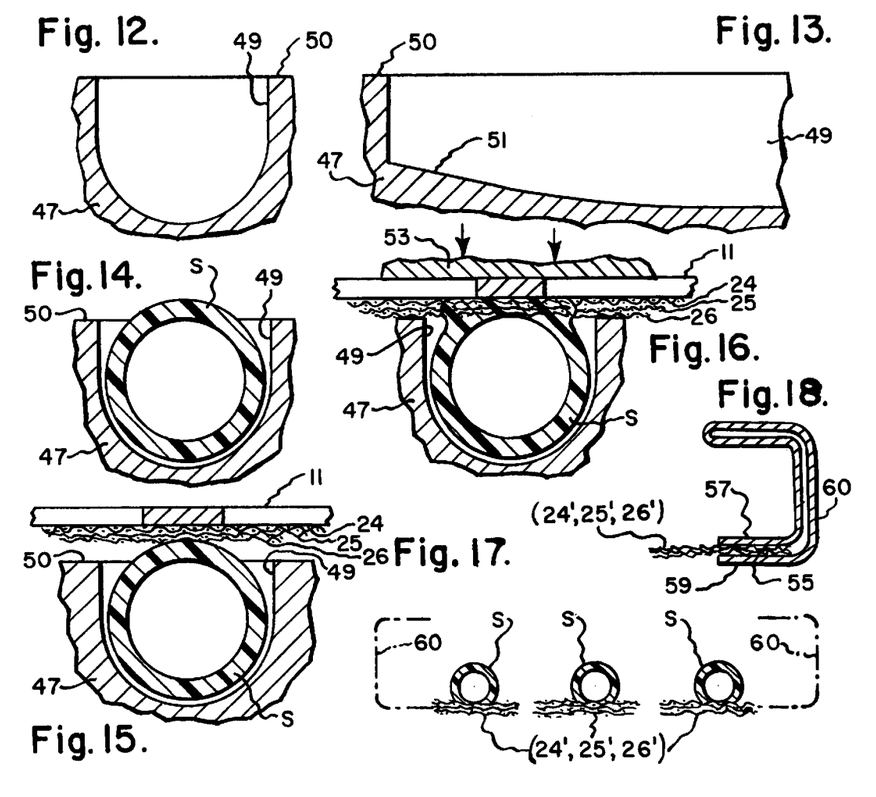
FIG. 12 is a fragmentary cross sectional view of the central portion of one of the grooves in the fixture.
FIG. 13 is an enlarged fragmentary cross sectional view of the end of the groove in the fixture.
FIG. 14 is a fragmentary cross sectional view showing a tube mounted in the groove of FIG. 12.
FIG. 15 is a fragmentary cross sectional view showing the screens bonded to the plate being superimposed over the fixture of FIG. 11 after the plastic tubes have been inserted in the latter.
FIG. 16 is a fragmentary schematic view showing a heated platen pressing the plate mounted screens into the plastic tubes mounted in the fixture of FIG. 11.
FIG. 17 is a partially schematic fragmentary cross sectional view of another embodiment of the present invention wherein the channeling strips are fused directly into screens which are not bonded to an apertured plate.
FIG. 18 is a fragmentary enlarged cross sectional view showing the edges of the screen assembly of FIG. 7 bonded into a channel member.
Figure 19:
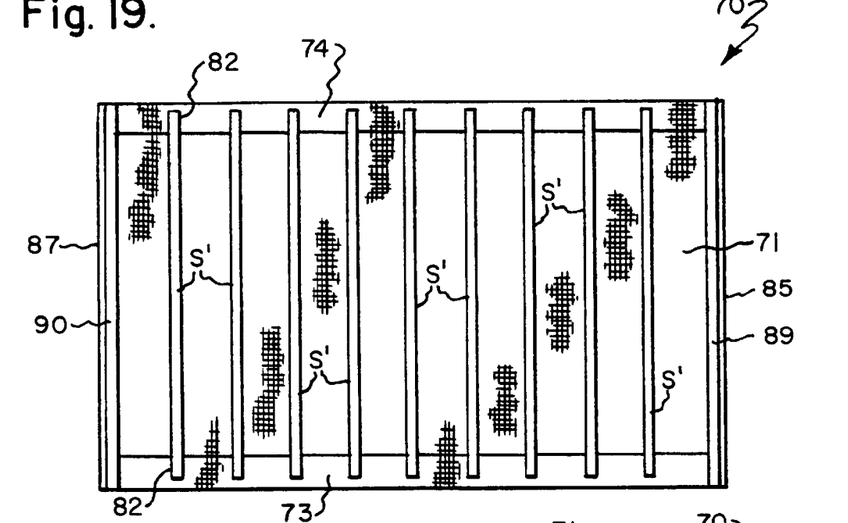
FIG. 19 is a plan view of another embodiment of the present invention.
Figure 20:
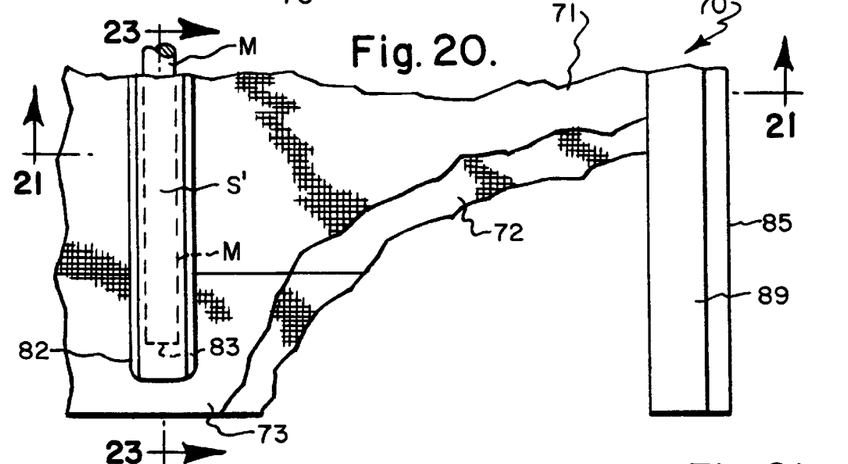
FIG. 20 is a view of an enlarged fragmentary portion of FIG. 19.

After the tubes S have been placed into the grooves 49, the plate 11 and the screens 24, 25 and 26 bonded thereto are inverted over fixture 47, as schematically depicted in FIG. 15. Thereafter, a heated platen 53 (FIG. 16) is pressed downwardly on plate 11 and the screens bonded thereto. This will cause the portions of tubes S which are contiguous to the screen assembly 11 to melt and fuse into screens 24, 25 and 26. The end portions 40 of tubes S will taper downwardly, as shown in FIG. 5, in view of the fact that the ends 51 of fixture 47 are shaped as shown at 51 in FIG. 13. It is to be especially noted that the fusing of tubes S into the screens 24, 25 and 26 and the fusing of the tubes S to the underlying metal portions 20 and 21 of plate 11 greatly strengthens the screen assembly, in addition to providing the channeling strips S.

In FIGS. 17 and 18 an alternate embodiment of the present invention is disclosed wherein the tubes S are fused into and bonded to a plurality of screens 24', 25' and 26' which are analogous to screens 24, 25 and 26, respectively, of the preceding figures, and which have their edges 55 clamped between the ends 57 and 59 of channel portions 60. The only difference between the embodiment of the preceding figures and FIGS. 17 and 18 is that the latter do not have a plate 11 to which the screens are actually bonded. However, the tubes S can be fused into screens which are not bonded to a plate because on cooling, the tubes S will not shrink appreciably so as to excessively bow the screens. Aside from the fact that the embodiment of FIGS. 17 and 18 does not have a plate, its mode of fabrication is the same as that of screen assembly 10, as described above relative to FIGS. 11–16.

In FIGS. 19–23 a further embodiment of the present invention is disclosed which is similar to the embodiment of FIGS. 17 and 18. However, it differs therefrom in that stiffening rods M, which are metal rods, preferably aluminum, are located within the elongated plastic tubular members which are bonded to the superimposed screens. It will be appreciated that the stiffening rods may be made of other metals, fiberglass, high temperature plastic or any other suitable material which will not warp when heated and which will have sufficient strength to prevent tubes S' from warping.

Figures 21, 22:
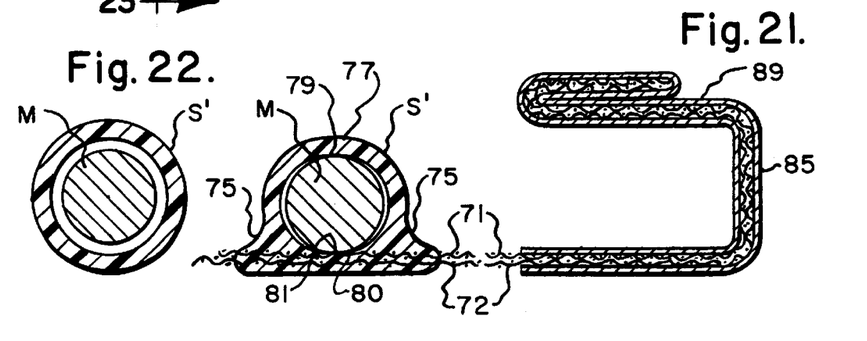
FIG. 21 is an enlarged fragmentary cross sectional view of FIG. 20 taken substantially along line 21—21.
FIG. 22 is a cross sectional view showing the relative sizes of the hollow tube and its stiffening rod before deformation of the tube.
Figure 23:
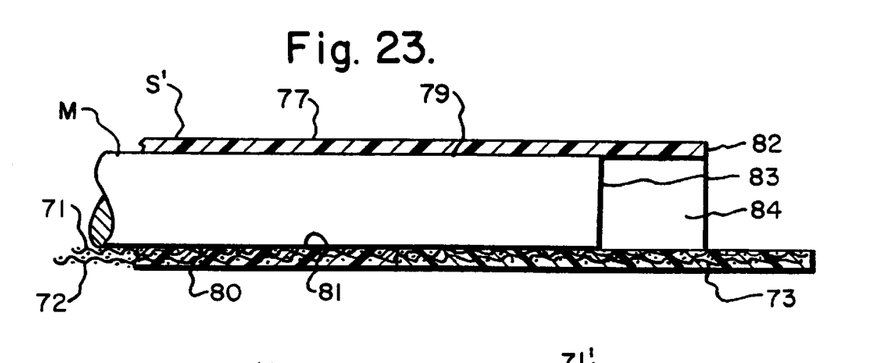
FIG. 23 is a fragmentary cross sectional view taken substantially along line 23—23 of FIG. 20.

In its more specific aspects, the screening screen assembly 70 comprises superimposed screens 71 and 72 which may have the parameters set forth above. In this respect, coarse screen 72 is basically a support for screening screen 71. As noted above relative to screen 24, screen 72 may be of between about 8 and 75 mesh or any other suitable mesh. Fine screening screen 71 may be between 80 and 400 mesh, as described above relative to the embodiment of the preceding figures. Screens 71 and 72 are initially bonded to each other by polyester borders 73 and 74 for the purpose of holding the screens together prior to the time that plastic tubes S' are bonded thereto in the same manner as described above relative to the preceding figures. Plastic tubes S' are originally of cylindrical shape, as shown in FIG. 22, and they are preferably fabricated of polyethylene, but they may be fabricated of any other suitable plastic. Metal rods M are located within tubes S'. The tubes S' are of the same dimension noted above relative to the preceding figures, namely, they preferably have an outer diameter of $\frac{3}{8}$", an inner of diameter of $\frac{1}{4}$" and a wall thickness of $\frac{1}{16}$". The metal rods M preferably have an outer diameter of $\frac{3}{16}$".

The metal rods M are inserted into each of the plastic tubes S' prior to the time that the plastic tubes are fused to the screens in the manner which was described above relative to FIGS. 11–15. The bonding of the tubes S' to the superimposed screens 71 and 72 results in their forming a shape which is essentially shown in FIG. 21 wherein fillets 75 are formed at the junctions with screen 71. Additionally, the top portion 77 of tube S' will bear down onto the top 79 of metal rod M and the lower portion 80 of metal rod M will be bonded to the adjacent portion 81 of the tube S' by the fused plastic. By virtue of the connections between the tube S' and metal rod M at areas 79 and 80, the metal tube M is securely held within each tube S'. While the ends 82 are not shown as tapering downwardly beyond the ends 83 of metal tubes M (FIG. 23), it will be appreciated that this configuration can be effected to further prevent metal tubes M from moving axially. Additionally, while it is not necessary, the open ends 84 of tubes S' can either be closed by applying proper fusing heat thereto or by plugging them.

The edges 85 and 87 of the screen assembly are formed into the shown channel-shaped members 89 and 90 with the screens 71 and 72 bound therein.

Figure 24:
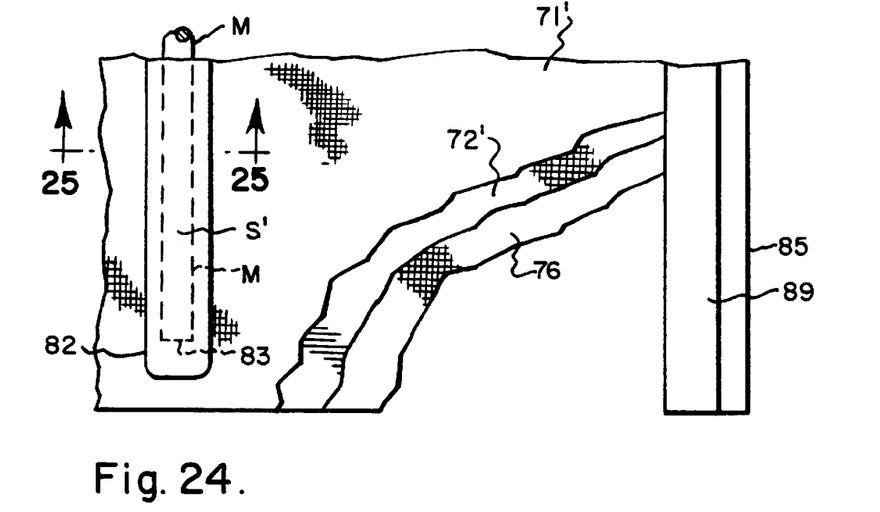
FIG. 24 is a view similar to FIG. 20 but showing an embodiment having three screens.
Figure 25:
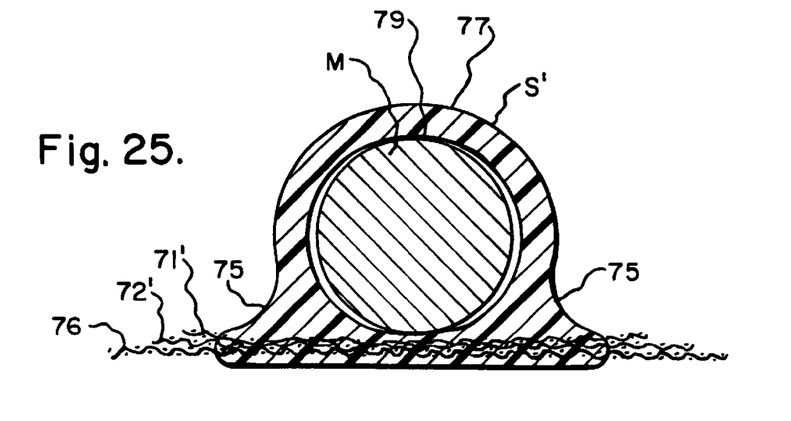
FIG. 25 is an enlarged cross sectional view taken substantially along line 25—25 of FIG. 24.

In FIGS. 24 and 25 a further embodiment of the present invention is disclosed wherein numerals and letters which are identical to those used in FIGS. 19–23 denote identical elements of structure. The only difference between the embodiment of FIGS. 19–23 and the embodiment of FIGS. 24 and 25 is that the latter has three superimposed screens. In this respect this embodiment has superimposed screening screens 71' and 72' which overlie and are bonded to a support screen 76. The dimensions of screens 71', 72' and 76 may be identical to the screens 24, 25 and 26 discussed above relative to FIG. 2, or any other suitable dimensions as is well known in the art.

Figure 26:
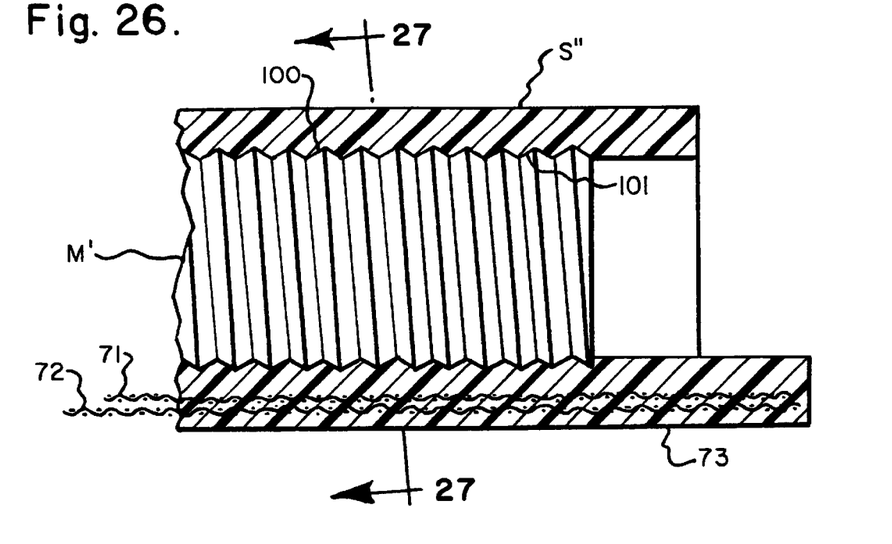
FIG. 26 is an enlarged fragmentary cross sectional view similar to FIG. 23 but showing another embodiment of the present invention.
Figure 27:
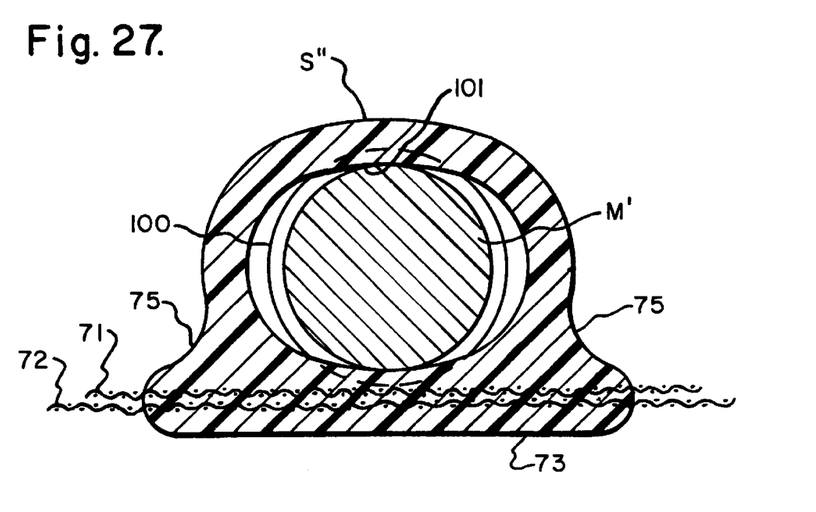
FIG. 27 is a fragmentary cross sectional view taken substantially along line 27—27 of FIG. 26.

In FIGS. 26 and 27, a still further embodiment of the present invention is disclosed which may be identical in all respects to the embodiment of FIGS. 19–23 except that the rod M' has an outer configuration of a very shallow helical thread 100 on its outer surface for the purpose of making a positive interfitting connection with the inner surface 101 of the plastic tube S". The outer dimension of rod M' is the same as rod M described above, and the dimensions of tube S" are the same as the dimensions of tube S' described above. Additionally, the numerals on FIGS. 26 and 27 which are identical to those of FIGS. 19–23 designate identical elements of structure. It will be appreciated that the rods which are inserted into the tubes may have outer configurations other than threaded for the purpose of providing an interfitting connection with the plastic tubes. Such outer configurations may be roughened surfaces or embossed surfaces with raised shallow projections or surfaces which have any type of higher and lower portions.

Figure 9:
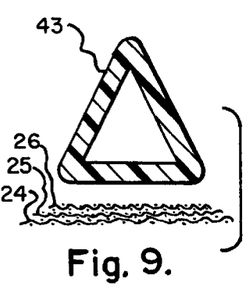
FIG. 9 is a cross sectional view showing still another possible shape of a channeling strip.
Figure 10:
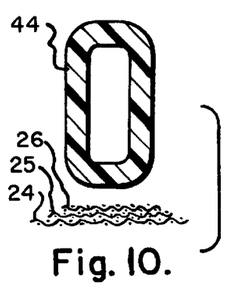
FIG. 10 is a cross sectional view showing yet another possible shape of a channeling strip.
Figure 11:
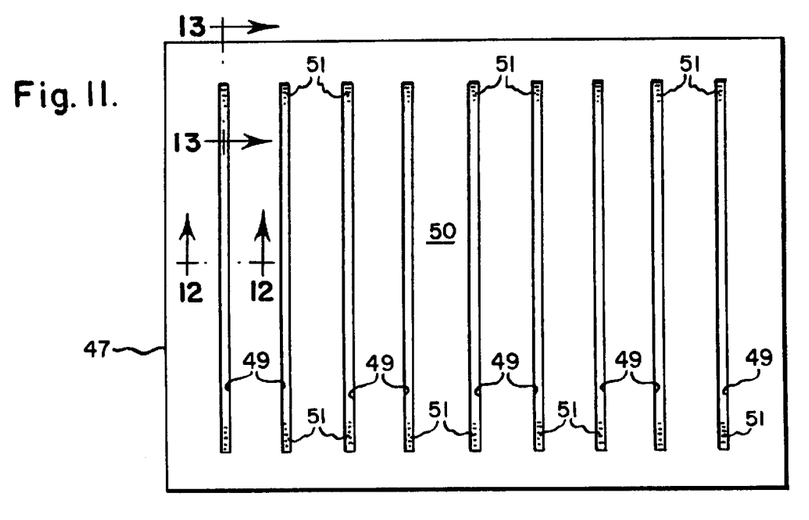
FIG. 11 is a plan view of a fixture for fabricating the screen assembly of FIG. 1.

While the above description of FIGS. 19–27 has shown tubes S' of hollow cylindrical form, it will be appreciated that the hollow tubes can be of any other suitable form including those shown in FIGS. 9 and 10 but not limited thereto.

It has been discovered that the presence of metal rods M and M' within tubes S' and S", respectively, cause the portions of the tubes S' and S", respectively, which fuse into superimposed screens 71 and 72 to spread better and permeate the screens better than if the metal rods M and M' were not present because the metal rods M and M' act as a backup to the portions of the plastic tubes S' and S" which fuse into the superimposed screen. Additionally, if there is any warping of the screens due to the contraction of the plastic tubes during cooling, the screens can be bent back to a more planar condition by merely bending the tubes which will then take a set to the position to which they have been bent because the rods M and M' have sufficient strength to resist the tendency for the tubes S' and S", respectively, to return to a bowed condition.

The above description has disclosed different screen arrangements of screening screens including an arrangement wherein a plurality of screens are bonded to an apertured plate and wherein a plurality of screens are used without being bonded to an apertured plate. It will be appreciated that the term screening screen as used in the claims not only covers the foregoing arrangements but also any other arrangement of one or more screens used for screening to which a plastic channeling strip can be bonded by fusion.

It will also be appreciated that while channels 22 and 23 have been disclosed for mounting the screen assembly in a screening machine, other types of mounting arrangements can be used for different types of machines, considering that the channeling strip aspect of the present invention is independent of the screen assembly mounting structure.

While preferred embodiments of the present invention have been disclosed, it will be appreciated that it is not limited thereto but may be otherwise embodied within the scope of the following claims.

What is claimed is:

1. A screen assembly for a vibratory screening machine comprising a screening screen having an upper surface, longitudinal side edges on said screening screen, a plurality of plastic channeling strips extending longitudinally between said longitudinal edges and fused to said screening screen and extending above said upper surface, and stiffening rods in said channeling strips.

2. A screen assembly for a vibratory screening machine as set forth in claim 1 wherein said plastic channeling strips are hollow and said stiffening rods are inserted into said hollow plastic channeling strips.

3. A screen assembly for a vibratory screening machine as set forth in claim 2 wherein said plastic channeling strips are substantially cylindrical before being fused to said screening screen.

4. A screen assembly for a vibratory screening machine as set forth in claim 1 including fillets at the junctions between said channeling strips and adjacent portions of said screening screen.

5. A screen assembly for a vibratory screening machine as set forth in claim 4 wherein said plastic channeling strips are hollow and said stiffening rods are inserted into said hollow plastic channeling strips.

6. A screen assembly for a vibratory screening machine as set forth in claim 5 wherein said plastic channeling strips are substantially cylindrical before being fused to said screening screen.

7. A screen assembly for a vibratory screening machine as set forth in claim 1 wherein said screening screen comprises a plurality of superimposed screens, and wherein said plurality of plastic channeling strips are fused to said plurality of superimposed screens.

8. A screen assembly for a vibratory screening machine as set forth in claim 7 wherein said plastic channeling strips are hollow and said stiffening rods are inserted into said hollow plastic channeling strips.

9. A screen assembly for a vibratory screening machine as set forth in claim 8 wherein said plastic channeling strips are substantially cylindrical before being fused to said screening screen.

10. A screen assembly for a vibratory screening machine as set forth in claim 7 including fillets at the junctions between said channeling strips and adjacent portions of said plurality of superimposed screens.

11. A screen assembly for a vibratory screening machine as set forth in claim 10 wherein said plastic channeling strips are hollow and said stiffening rods are inserted into said hollow plastic channeling strips.

12. A screen assembly for a vibratory screening machine as set forth in claim 11 wherein said plastic channeling strips are substantially cylindrical before being fused to said screening screen.

13. A screen assembly for a vibratory screening machine as set forth in claim 1 wherein said stiffening rods have outer configurations which provide an interfitting connection with said channeling strips.

14. A screen assembly for a vibratory screening machine as set forth in claim 13 wherein said outer configurations are in the form of a thread.

15. A screen assembly for a vibratory screening machine as set forth in claim 13 wherein said plastic channeling strips are substantially cylindrical before being fused to said screening screen.

16. A screen assembly for a vibratory screening machine as set forth in claim 13 including fillets at the junctions between said channeling strips and adjacent portions of said screening screen.

17. In a vibratory screening machine having a frame and a plurality of stringers extending longitudinally on said frame for supporting a screen assembly, a screen assembly comprising a screening screen, longitudinal edges on said screening screen, channels on said longitudinal edges for securing said screening screen in a vibratory screening machine, and a plurality of plastic channeling strips having stiffening rods therein extending longitudinally between said longitudinal edges and fused to said screening screen and extending above said screening screen, each of said channeling strips extending longitudinally of and overlying an adjacent one of said stringers.

18. A screen assembly for a vibratory screening machine as set forth in claim 17 wherein said plastic channeling strips are hollow and said stiffening rods are inserted into said hollow plastic channeling strips.

19. A screen assembly for a vibratory screening machine as set forth in claim 18 wherein said plastic channeling strips are substantially cylindrical before being fused to said screening screen.

20. A screen assembly for a vibratory screening machine as set forth in claim 17 including fillets at the junctions between said channeling strips and adjacent portions of said screening screen.

21. A screen assembly for a vibratory screening machine as set forth in claim 20 wherein said screening screen comprises a plurality of superimposed screens, and wherein said plurality of plastic channeling strips are fused to said plurality of superimposed screens.

22. A screen assembly for a vibratory screening machine as set forth in claim 21 including fillets at the junctions between said channeling strips and adjacent portions of said plurality of superimposed screens.

23. A screen assembly for a vibratory screening machine as set forth in claim 22 wherein said plastic channeling strips are hollow and said stiffening rods are inserted into said hollow plastic channeling strips.

24. A screen assembly for a vibratory screening machine as set forth in claim 23 wherein said plastic channeling strips are substantially cylindrical before being fused to said screening screen.

\* \* \* \* \*